United States Patent [19]
Wheatley

[11] Patent Number: 5,293,046
[45] Date of Patent: Mar. 8, 1994

[54] OPTICAL HIGH PRESSURE SENSOR

[75] Inventor: Samuel E. Wheatley, Encinitas, Calif.

[73] Assignee: The United States of America as represented by the Secretary of the Air Force, Washington, D.C.

[21] Appl. No.: 851,405

[22] Filed: Mar. 13, 1992

[51] Int. Cl.⁵ .................................................. F01J 1/58
[52] U.S. Cl. ............................... 250/458.1; 250/461.1
[58] Field of Search ............... 250/458.1, 459.1, 461.1, 250/227.18

[56] References Cited

U.S. PATENT DOCUMENTS

| | | | |
|---|---|---|---|
| 4,492,121 | 1/1985 | Lehto | 250/368 |
| 4,710,033 | 12/1987 | Hirano et al. | 250/458.1 |
| 4,805,461 | 2/1989 | Gupta et al. | 250/227.18 |

Primary Examiner—Paul M. Dzierzynski
Assistant Examiner—Richard Hanig
Attorney, Agent, or Firm—Donald J. Singer; William G. Auton

[57] ABSTRACT

A high pressure sensor which uses a ruby as a pressure sensor is disclosed. This system includes a high pressure Hg lamp which is used to excite the ruby R1 and R2 lines because it has a spectrum which is a good match to the ruby absorption spectrum. The Hg lamp output is filtered to pass wavelengths shorter than about 6300 angstroms so as not to affect the detection system. The light is directed through a dichroic mirror which passes all of the lamp output. The lamp output is then coupled into the optical fiber and carried to the test point. A small ruby is cemented to the end of the fiber and the whole crystal is aluminized. Some of the fluorescence will couple into the fiber and be carried back to the dichroic mirror which reflects ruby fluorescence into the detector but passes any of the original lamp light. The aluminum coating on the ruby increases the amount of fluorescence that is collected. In this configuration, the ruby serves as an optically dynamic pressure sensor, since the fluorescence of the ruby produces known spectral wavelength shifts in response to pressure changes in its environment.

9 Claims, 3 Drawing Sheets

OPTICAL HIGH PRESSURE SENSOR

BACKGROUND OF THE INVENTION

The present invention relates generally to high pressure transducers and more specifically to an optical pressure sensor which produces an optical response that varies with its ambient environment, and measures pressures which are characterized by sudden extreme changes in pressure, such as a nuclear detonation.

The Minuteman intercontinental ballistic missiles in the United States are housed underground in concrete silos so that they may withstand the nuclear detonation of sea launched ballistic missiles and near misses of Soviet intercontinental ballistic missiles. These hardened silos allow the United States to withstand a first strike nuclear confrontation initiated by foreign powers, and strike back.

The sufficiency of the hardened silos is tested by a detonation of munitions in proximity with silo models to produce a shock wave that simulates a nuclear detonation. These tests need to be monitored by pressure sensors, but most commercially available pressure sensors which have an electrical output, do not have the adequate pressure range of electrical bandwidth to measure the extreme variations in pressure characterized by a simulated nuclear detonation during silo testing.

Most high pressure sensors are based on electrically sensing the elastic response of a body to an external pressure. For pressures well below the elastic limit of typical materials (nominally 100,000 psi), a macroscopic change is usually observed such as the flexing of a diaphragm. An electrical transducer such as a strain gauge is used to sense the deflection of the sensor. In piezoelectric sensors the elastic material and electric transducer are combined in one material. For higher pressures, where the microscopic structure of the material is strongly perturbed, it is often possible and preferable to directly measure the change in some material property (such as resistance).

For a sensor geometry which imposes tension on the elastic sense element, measurement is limited to pressures below its yield point; that is those tensions which do not cause permanent distortion. A material can usually withstand greater compressional stress than tensile stress if the material is free of defects and the pressure is applied uniformly from all directions. Sensors based on compression must be used above the yield point of the material.

Available sensors typically convert the strain in the elastic material to an electrical signal by means of an electrical transducer. All of the methods used to sense linear displacement (such as metallic or semiconductor strain gauges, changes in inductance or capacitance, acoustic frequency, Hall effect, etc.) can be applied to measure the strain in the sensor. Direct pressure sensing transducers can also be used which employ piezoelectric or piezoresistive materials.

Since all the sensors involve mechanical motion of the combined elastic and electrical sensor in response to the applied pressure, the dynamic response or transfer function will depend on size and stiffness of the sensor. A higher resonant frequency of the device can be obtained by making the the sensor as small as possible and using a stiff sensor material. The sensors will provide a linear output for frequencies up to 20% of the resonant frequency. Their useful bandwidth can be extended by standard signal processing techniques which can deconvolve the frequency dependent sensitivity of the sensor near resonance. Pressure sensors based on small bonded strain gauges appear to have the highest frequency response which extends to about 0.100 KHz (based on a natural resonance of 500 KHz). Piezoelectric sensors extend to several 10's of KHz. Both types can measure up to around 100,000 psi. The low frequency limit usually depends on the design of the elastic sensor. The electrical transducers will generally respond to static pressures.

In summary, pressure sensors are commercially available which can provide measurements to 100,000 psi with a bandwidth of 100 KHz. It is not likely that commercially available sensors can achieve significantly higher bandwidth and respond to the high pressures of interest here.

The test of providing a high pressure transducer which has a sufficient pressure range to measure a pressure consonant with a nuclear detonation is alleviated, to some extent, by the systems disclosed in the following U.S. Patents, the disclosures of which are incorporated herein by reference:

U.S. Pat. No. 4,654,528 issued to Cloud, Jr. et al;
U.S. Pat. No. 3,859,519 issued to Weischedel;
U.S. Pat. No. 3,831,028 issued to Kerlman et al;
U.S. Pat. No. 4,044,258 issued to Frangel;
U.S. Pat. No. 4,577,510 issued to Bur et al;
U.S. Pat. No. 4,366,714 issued to Adorni;
U.S. Pat. No. 3,970,862 issued to Edelman et al;
U.S. Pat. No. 3,894,243 issued to Edelman et al; and
U.S. Pat. No. 3,940,974 issued to Taylor.

The above-cited patents disclose state-of-the-art nuclear explosion detectors and pressure sensor systems. To measure the extreme changes in pressure that characterize a nuclear detonation, one must have a pressure transducer with an extremely wide pressure range that accommodates changing conditions. Mechanical sensors possess inherent limitations that prevent them from having adequate pressure ranges for this use. Hybrid optical-mechanical pressure sensors also suffer from limited bandwidth. Purely optical pressure sensors in which some optical material property is modified by pressure have the potential for large bandwidth and greater pressure range. In addition, they offer immunity from EMI which can be a problem. Such sensors have been used extensively for static pressure measurement but have not been applied to the measurement of dynamic pressures such as those encountered in shock waves.

In view of the foregoing discussion, it is apparent that there currently exists the need for an optical high pressure sensor system which has a sufficient pressure range to make the requirement measurements on silo models. The present invention is intended to satisfy that need.

SUMMARY OF THE INVENTION

The present invention is an optically dynamic high pressure sensor which uses a ruby as the pressure sensor. One embodiment of the invention includes a mercury lamp, the ruby sensor, an optical fiber which has one end fixed to the ruby sensor, a dichroic mirror, and an optical detector.

In operation, the high pressure Hg lamp is used to excite the ruby R1 and R2 lines because it has a spectrum which is a good match to the ruby absorption spectrum. The Hg lamp output is filtered to pass wavelengths shorter than about 6300 angstroms so as not to affect the detection system. The light is directed through a dichroic mirror which passes all of the lamp output. The lamp output is then coupled into the optical fiber and carried to the test point. A small ruby is cemented to the end of the fiber and the whole crystal is aluminized. Some of the fluorescence will couple into the fiber and be carried back to the dichroic mirror which reflects ruby fluorescence into the detector but passes any of the original lamp light.

The optical response of the ruby varies dynamically with changes in the pressures of the ruby's environment. When the detector receives the ruby fluorescence from the optical fiber, it produces an electrical detection signal indicative of the pressure which surrounds the ruby. This detection is made without the mechanical limitations that characterize mechanical pressure transducers, and allows the required measurements to be made when testing silo models. These pressures range up to 150,000 psi or 10 Kbars.

It is an object of the present invention to provide an optical high pressure sensor which uses a ruby as a pressure sensor.

It is another object of the present invention to measure extreme changes in pressure that characterize a nuclear detonation and other high energy explosions.

It is another object of the present invention to measure extreme changes in pressure without the limits of pressure range and electrical bandwidth experience with most commercially available pressure sensors. The desired bandwidth is 1 MHz.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is an optical high pressure sensor which uses a ruby as a pressure probe. As mentioned above, these sensors may be used to measure pressures in buried structures near a surface high energy explosion.

The sensor is useful for the measurement of transient high pressures as a function of time such as those associated with shock waves in solids. The basic sensor concept is quite general but typical performance specifications include the measurement of pressure to 300,000 psi, a pressure resolution of 3,000 psi, a bandwidth of 100 KHz, and a measurement duration of 100 ms.

The operation of the sensor is based on the fact that the fluorescence wavelength of certain crystals is a function of pressure. This effect has been used to make static pressure measurements often using ruby as the sensor material.

This invention extends this idea to permit dynamic pressure measurements. The sensor is intended to measure pressures which vary rapidly compared to the thermal time constant (typically 1 second) of the sensor such as those encountered in explosively generated shock waves and, therefore, the sensor is diabatically heated by the shock wave. This change in temperature causes a change in fluorescence frequency similar to that induced by a change in pressure. The combined frequency shift due to a simultaneous change in both pressure and temperature causes difficulty in extracting a pressure signal.

These difficulties have been circumvented in this invention by the recognition of the following points. In a sufficiently small sample, a suitable crystal can a achieve mechanical equilibrium with a dynamic high pressure environment much faster than it can achieve thermal equilibrium. The fluorescence spectrum of a suitable crystal can be measured under static conditions at a matrix of pressures and temperatures characteristic of that material under shock loading can also be determined. In a suitable crystal, the linewidth of a spectral feature is a function of the temperature alone. The instantaneous temperature of the crystal can thus be determined from the linewidth. Knowing the instantaneous temperature while under dynamic loading, the portion of the observed frequency change due to temperature and that due to pressure can be determined. Thus the instantaneous pressure can also be determined.

Figure 1:
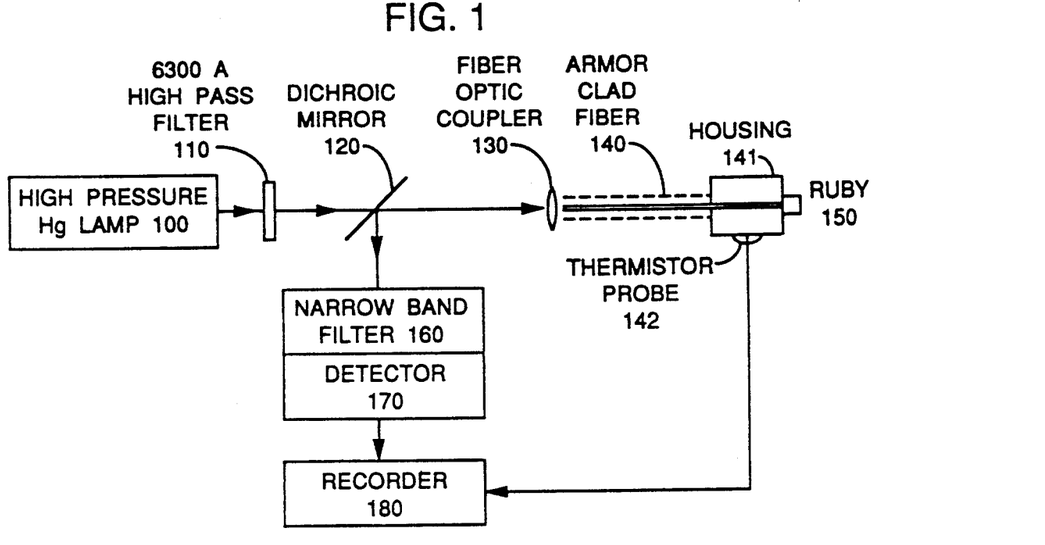
FIG. 1 is a block diagram of the present invention.

The reader's attention is now directed towards FIG. 1, which is a block diagram of the optical pressure sensor system of the present invention. The system of FIG. 1 includes a high pressure mercury lamp 100, a 6300 angstrom high pass filter 110, a dichroic mirror 120, a fiber optic coupler 130, an armor clad optic fiber 140, a housing 141, a ruby 150, a narrow band filer 160, a detector 170, and a recorder 180.

The Hg lamp 100 produces an illuminating output which is filtered by the high pass filter 110 to pass only wavelengths shorter than about 67300 Å so as not to affect the detection system. The light is directed through the dichroic mirror which passes all of the lamp output (the dichroic mirror could also function as the high pass filter). The lamp output is then coupled 130 into the optical fiber 140 and carried to the test point.

Figure 2:
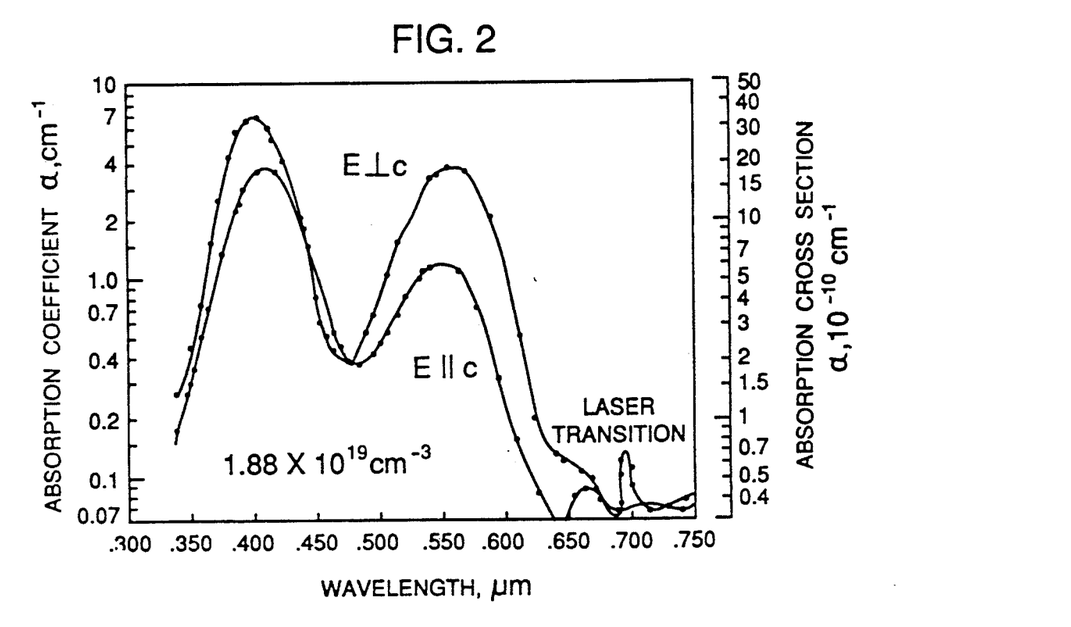
FIG. 2-5 are charts depicting the spectral characteristics of the fluorescence produced by the ruby of FIG. 1.

The ruby 150 is cemented to the end of the optical fiber 140 and serves as a pressure sensor as follows. The high pressure Hg lamp is used to excite the ruby R1 and R2 lines because it has a spectrum which is a good match to the ruby absorption spectrum shown in FIG. 2. FIG. 2 is a chart of the absorption coefficient and absorption cross section for the ruby as a function of wavelength in microns. The ruby will optically respond to the illuminating wavefront with a fluorescence (FIG. 3) which is affected by temperature (FIG. 4) and pressure (FIG. 5) in a manner discussed in detail below. FIG. 2 is a chart that shows the absorption coefficient and absorption cross section as functions of wavelength for $E||c$ and $E\perp c$. The 300 degree K. data were derived from transmittance measurements on a pink ruby with an average Cr ion concentration of $1.88 \times 10^{19}$ cm$^{-3}$.

Some of the fluorescence will couple into the fiber and be carried back to the dichroic mirror which reflects ruby fluorescence into the detector but passes any of the original lamp light. The aluminum coating on the ruby increases the amount of fluorescence that is collected. The ruby fluorescence spectrum is shown in FIG. 3.

Figure 3:
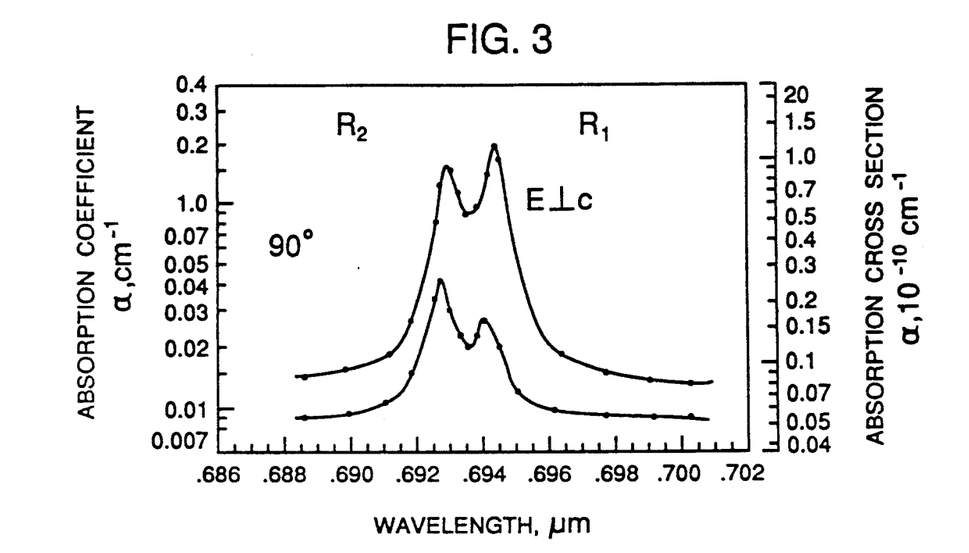

FIG. 3 is a chart that shows the absorption coefficient and absorption cross section as functions of wavelength for E||c and E⊥ c. The sample was a pink ruby laser rod having a 90 degree c-axis orientation with respect to the rod axis and a Cr concentration of $1.58 \times 10^{19}$ cm$^{-3}$.

Figure 4:
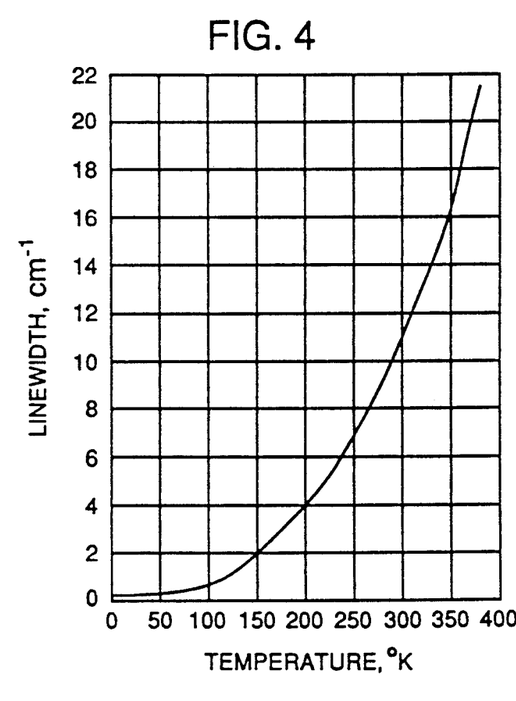

The spectral properties of ruby are temperature dependent. FIG. 4 shows the ruby fluorescence linewidth as a function of temperature. The ruby would function better as a pressure sensor if the crystal were cooled so that the two spectral lines were resolved. This could be done with a solid state Peltier cooler but would require wires to supply the power. For best results, the temperature of the crystal should be measured and/or controlled since changing ambient temperature or heating caused by excessive excitation will change the fluorescence and hence the indicated pressure. For the R lines, the temperature coefficient is equivalent to 0.17 kbar/K. suggesting that temperature be known or controlled within ± one degree K.

Figure 5:
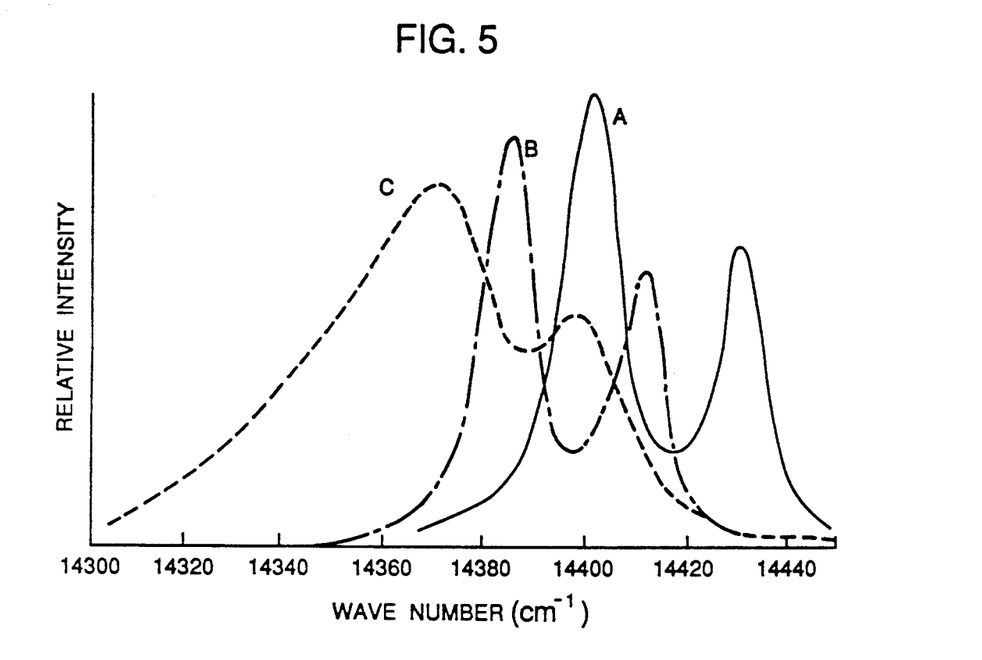

The pressure dependent shift for ruby is shown in FIG. 5. The figure is a chart of the R-line luminescence of a crystal ruby under three conditions. In the condition associated with curve A, the sample ruby is at ambient atmospheric pressure. In the condition associated with curve B, the ruby sample is at a pressure of 22.3 Kbar. In the example of curve C, the ruby is at an average pressure of 40 Kbar.

In the chart of FIG. 5, it is important to note the change in peak amplitude and line shape as the pressure increases. The pressure shift for ruby is −0.77 cm(−1)/kbar for R1 and −0.84 cm(−1)/kbar for R2 from 0 to 23 kbar. Another source gives values of −0.93 and 0.82 respectively from 0 to 1 kbar. We can expect to see a shift of about 8 cm(−1) for the 10 kbar maximum pressure of interest here.

In the system of FIG. 1, the fluorescence produced by the ruby is conducted back along the optional fiber 140 through the coupler 130, mirror 120, and filter 160 into the detector 170. The detector 170 produces an electrical signal in response to this fluorescence which is indicative of pressure as follows. As the pressure increases, the fluorescence will shift to lower frequencies, and an increase in signal amplitude will be observed. The signal will increase monotonically with pressure (but not linearly) until the peak of the peak of the fluorescence line is reached after which the signal would decline. There is enough room on the side of the line at room temperature to measure to 10 kbar. This requires a filter that is 1 Å wide or less at the fluorescence frequency. While interference filters with such narrow passband exist, they would be quite expenses. A better approach is to use a filter with a 10 Å passband which is more commonly available and an etalon to achieve the desired filtering. A solid state detector is used to detect the radiation. Once the sensor is calibrated for a particular temperature and observation frequency, very rapid pressure measurement is achieved by the pressure sensor system of FIG. 1. The ruby may also be completely coated with aluminum in order to enhance the amount of fluorescence transmitted back along the optic fiber.

The principles of operation of the system of FIG. 1 are described in detail below. However, further details of the wavelength shift or ruby luminescence can be found in the following technical reports, which are incorporated herein by reference:

P. Horn, Y. M. Gupta, G. E. Duvall, "Feasibility of Measuring Ruby Luminescence Wavelength Shift Under Shock Loading", Defense Nuclear Agency Technical Report DNA-TR-85-392, Sep. 1, 1985; and G. Haugen and T. Hirchfeld, "Fiber Optics Temperature and Pressure Probe", Lawrence Livermore National Laboratory Report UCID-20563, October 1985.

Returning to FIG. 1, all the elements depicted are in themselves commercially available components. The high pressure mercury lamp together with the 6300 angstrom high pass optical filter 100 act as an optical excitation source whose illumination is transmitted through the dichroic mirror 120 and into the optical fiber 140.

The illumination from the fiber 140 is propagated to the ruby sensor 150, which is excited optically and fluoresces. This fluorescence experiences a pressure induced shift in wavelength in response to pressures on the ruby from the environment. Since the relationship between the pressure and the shift in wavelength are known, the amount of pressure on the ruby can be determined from the measured shift in wavelength.

Ruby has been used because of its very low background fluorescence level. Ruby does not have as large a pressure shift as chromium doped yttrium alluminate (Cr:YALO) for example. Much of the background fluorescence may be due to the poor quality crystals that were used. Therefore an alternative to the ruby crystal 150 in FIG. 1 is the chromium doped yttrium alluminate crystal. However, it is important to note that using a ruby has the advantage that there is a great deal of experience with it. Although the pressure shift is smaller than desired, it is adequate for 10 kbar measurements.

The dynamic behaviour of the sensor is largely determined by the sensor size and mounting technique. Samples of ruby which are on the order of 0.1 mm on a side provide good performance in static tests. The acoustic propogation time through a crystal of this size is on the order of 10 ns (although a shock wave is moving faster than this). Allowing several propogation times to reach equilibrium implies that measurements could be made to at least 10 MHz. In this application, the sensor material will be bonded to an optical fiber which will reduce its frequency response somewhat. However for waves propogating across the fiber and sensor, the effect is not expected to be large.

In one embodiment of the invention, the fiber optic cable 140 in FIG. 1 is encased in armor. This armor may be the steel pipe coverings which is used to encase the buried communication lines that electrically connect the Minuteman III missiles to their respective launch control centers. When the fiber optic cable is enclosed, it can withstand pressures approaching those induced by a nuclear detonation. This allows the system of FIG. 1 to measure and record pressures in silo testing when the measurement equipment is inside the silo. During the testing, the ruby sensor may be destroyed but up until its destruction, it will relay its pressure measurements through the armour-clad cable to the measurement equipment.

As mentioned previously, the ruby sensor 150 should be fixed to the optical fiber 140 with a cement which has good optical transmission. This will efficiently couple excitation and fluorescence light in and out of the fiber.

The optical fiber 140 should have a large numerical aperture and be able to be used with connectors. The fiber must be contained in an armored cable and shock mounted to protect it from the shock wave being measured. At the end, the fiber must be mounted in a protective housing which also contains the sensor material.

The sensor housing 141 will affect the pressure measurements because it is close to the measurement point. Ideally, the housing material would be made of the same material as the medium under test to prevent shock reflections or other perturbations. When this is not possible, their effects on the measurement should be quantified. The fiber and sensor should be shock mounted and "floating" in the housing.

Because the sensor itself is quite small, it will respond essentially isotropically to pressure. However, the sensor housing introduces directionality to the sensor. If the shock wave is incident directly on the housing, the pressure will be increased in the vicinity of the sensor due to reflections. A better mounting technique is to place the sensor on the side of the housing so that it will not sense the inevitable reflections. In certain applications the sensor can be surface mounted and shock waves moving parallel to the surface will be accurately measured. In situations where the shock direction is not known because of a complex geometry, the housing could carry multiple sensors which could be used to determined shock direction and velocity.

Once any sensor is designed and built, it will have to be tested and calibrated. It is desirable to calibrate it under both static and dynamic conditions.

The sensor can be calibrated statically in a piston and cylinder device which contains a liquid or gas to provide the desired hydrostatic environment. Pressure is not applied directly to the sensor by the piston. A good pressure transmitting medium is hydraulic oil which will work well to at least 100,000 psi. In addition some oils are optically transparent which allows the optical properties of candidate sensor materials to be investigated. A commercially available pressure sensor will be immersed in the fluid along with the sensor under test to calibrate it. Alternatively, the fluid pressure could be monitored externally by a standard mechanical (Heise) pressure gauge. Fairly simply construction techniques (e.g. armored O-ring seals) can be used to construct the test cell if the pressure is limited to 10 kbar.

The sensor can be calibrated dynamically in a simple apparatus in the laboratory. Planar shock waves can be produced easily in a hollow tube (air shocks) or rod using a commercially available explosive nail driver. This is essentially a small caliber gun without the bullet. The cartridges for the gun are available in various sizes and should be a reasonably well controlled and reproduceable source. The initial shock is produced in air and has to be coupled to the desired medium. Thus air shocks can be produced efficiently but large losses are expected in coupling the air shock to a solid. If the sensor under test is mounted flush with the interior surface of the ruby used to propogate an air shock, a minimum perturbation of the wave will result.

Commercially available pressure sensors cannot be used to check the optical sensor's performance. To calibrate the optical sensor, the shock pressure must be derived from the shock wave velocity and particle velocity. If an optical sensor assembly is built containing two sensors which are known distance apart, then the shock wave velocity can be easily determined. The particle velocity can be determined by the standard technique of measuring the free surface velocity at the end of the rod. These measurements then allow the shock pressure to be calculated and compared with the value measured by the optical sensor.

The way in which the sensor is coupled to the surrounding medium is an issue. If the sensor is in intimate contact with a continuous medium then the coupling to the sensor will be controlled by the acoustic impedances of each material. If the sensor is not in intimate contact, the pressure wave must first couple to the intermediate medium (air) and then into the sensor. In these cases it should be possible to relate the measured pressure to the pressure in the original medium. If the sensor is placed in a granular medium such as soil or concrete, the sensor should be much larger than the grain size so that an average pressure value is obtained. The sensor should also be as small as possible to maximize its frequency response. The need to use a large area pressure sensor so that the medium appears continuous to it will limit the frequency response.

Another issue is how the sensor perturbs the pressure that is being measured. This problem is common to all mechanical means of measuring pressure. The best approach would be to make the sensor have the same acoustic impedance as the medium under test so that wave propogation is not disturbed. The next best approach is to orient the sensor so as not to cause perturbations at the point of measurement (e.g. flush mounting in a surface).

As mentioned above, the illumination from the excitation source will excite the ruby R1 (694.3 mm) and R2 (692.9 mm) spectral lines which experience a wavelength shift in response to the dynamic pressures ambient to the ruby 150. The narrow band filter 160 admits only the ruby luminescence to the detector 170 and recorder 180 so that the fluorescent spectrum may be recorded continuously as it evolves in time.

In the above-cited reference by P. Horn et al, it is noted that the major spectral change associated with stress is the shift in the wavelength of the R-lines. At a pressure of one atmosphere, the R1 line has a wavelength of 694.3 mm and the R2 line has a wavelength of 692.9 mm. Both lines have a 0.5 mm linewidth. In the case of hydrostatic pressure exerted on the ruby, the linewidth remains constant, and both R lines shift towards a longer wavelength at a rate of approximately 0.0365 mm/kbar.

As mentioned above in the description of FIG. 4, the R-lines are responsive to temperature. For this reason the system of FIG. 1 includes the thermistor probe 142 which is fixed in proximity with the ruby sensor 150 in the housing 141. The thermistor allows the temperature related special changes noted in the Horn et al reference to be subtracted from the spectral shifts measured. This results in a pressure sensor system which is relatively uncontaminated by thermal changes. More specifically, Horn et al teach that below 100 degrees K., there is very little wavelength shift. Above 200 degrees K., both the R1 and R2 shift linearly towards a longer wavelength at a rate of 0.0068 mm/degree K.

Both the thermistor temperature probe 142 and the detector 170 are commercially available items. More details of suitable optical detectors can be found in the text entitled "Optical Radiation Detectors" by E. L. Derenak et al, published by John Wiley and Sons in 1984, the disclosure of which is incorporated herein by reference. This text describes state-of-the-art photovoltage detectors that include photoconductors, charge coupled device arrays, and charge transfer devices that may be used in the detector 170 of FIG. 1. Such photoconductor detectors are believed to be understood and need not be described in any further detail. The recorder 180 is similar to the detector 170 in that a wide variety of commercially available alternatives exist that can receive and record the electrical data signals from the detector 170 and the thermistor 142. The recorder 180 is electrically connected with the optical photovoltage detector 170 and the thermistor 142 so that an actual wavelength shift of the fluorescence may be measured while the effects of thermal contamination of the wavelength may be accounted for and eliminated from the measure of pressure changes in the environment of the ruby 150. As discussed above, the thermally induced changes in the wavelength shift are subtracted from the wavelength shift actually measured to perform temperature compensation. In this system of FIG. 6, the recorder device is a computer 610, which can perform this subtraction. The electrical analog signals can be recorded on magnetic tape for later analysis or converted into digital signals by an A/D converter and input into a microprocessor. The above-cited Kerlman et al reference includes a photo-multiplier, amplifier, recorder and counter suitable for use with the present invention. The above cited Adornai reference discloses a temperature probe suitable for uses as the thermistor 142 of FIG. 1.

The sensor system of FIG. 1 should measure pressure up to 150,000 psi. The ruby sensor will operate in a dirty and electrically noisy environment, and may be either mounted on the surface of a structure, or buried in the earth. After testing, the sensor may not be recoverable, but it will measure the pressure of a nuclear detonation up to 10 Kbars, and transmit this measurement before its destruction.

Figure 6:
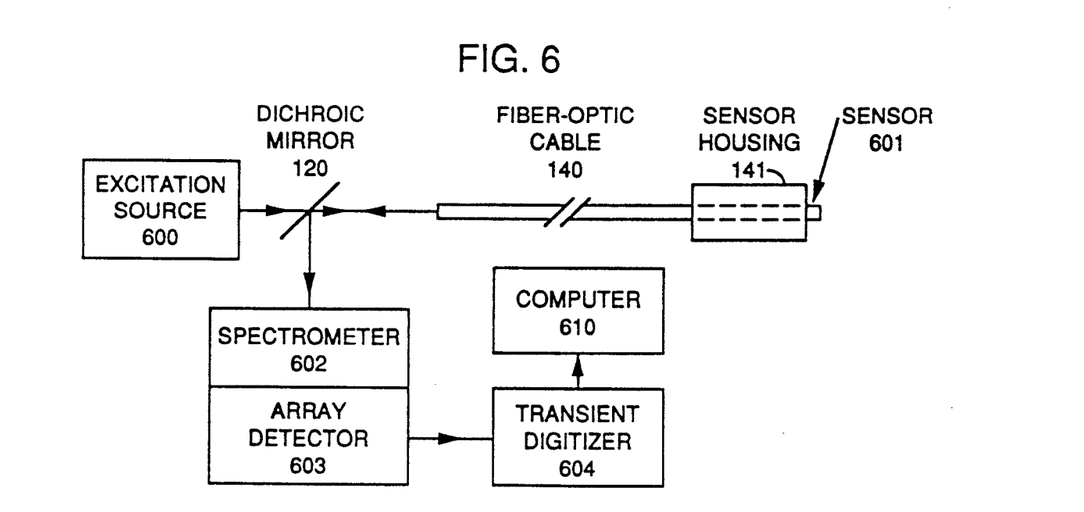
FIG. 6 is a block diagram of another embodiment of the invention.

FIG. 6 is a block diagram of another embodiment of the present invention. The system of FIG. 6 includes an excitation source 600, a dichroic mirror 120, a fiber optic cable 140, a sensor housing 141, an optical pressure sensor 601, a spectrometer 602, an optical array detector 603, an A/D converter 604, and a computer 610.

The excitation source 600 may be the mercury lamp 100 and high pass filter 110 of FIG. 1, which produce an excitation signal that stimulates fluorescence in the optical pressure sensor 601. The dichroic mirror 120, fiber optic cable 140, and housing 141 operate as described in the system of FIG. 1.

The sensor 601 may be the ruby crystal of FIG. 1, or any other crystal such as the chromium doped yttrium alluminate crystal described above. As long as the crystal produces fluorescence in which the spectral lines exhibit known frequency shifts in response to pressure changes, that crystal may be used in the system of FIG. 6 as a dynamic pressure transducer.

The spectrometer 602 of FIG. 6 receives the fluorescence produced by the sensor 601 from the dichroic mirror, and measures the spectral shift in wavelength therein. The advantage of using the spectrometer 601 is that it will display the fluorescence while filtering out any of the excitation signal that may accompany the fluorescence through the dischroic mirror 120.

It is believe that the use of spectrometers is well understood, and needs not be explained in further detail. Additional information on such systems may be found in such standard texts as "An Introduction to Spectroscopy" by Dr. Werner Brugel, published by John Wiley and Sons in New York in 1762, the disclosure of which is incorporated herein by reference.

The optical array detector 603 of FIG. 6 receives and converts the fluorescence from the spectrometer into analog photovoltage electrical signals which manifest the spectral shift in wavelength exhibited by the fluorescence in response to changes in pressure. The correlation between the shift in wavelength with an estimate of pressure is made in the computer 610 after the signals are converted into digital by the digitizer 604. The purpose of the computer 610 is to provide an estimate of the changes in pressure that actually occur in proximity with the sensor 601. This is accomplished as described below.

As mentioned above, when the crystal used in the sensor 601 is a ruby, it produces a fluorescence which includes an R1 line (which has a wavelength of 694.3 mm) and an R2 line (which has a wavelength of 692.9 mm). Both of these lines shift towards a longer wavelength at a rate of approximately 0.0365 mm/kbar according to Mr. Horn in the above cited Horn et al reference.

The normal way of measuring static pressure with the ruby sensor is to record the entire fluorescence spectrum and the temperature and use a curve fitting technique to determine the shift. By recording some reference spectral lines (such as a low pressure neon spectrum) on the same record, the determination of spectral shift is improved.

The pressure dependent shift for ruby is shown in FIG. 5. Note the change in peak amplitude and line shape as the pressure increases. The pressure shift for ruby is $-0.77$ cm$(-1)$/kbar for R1 and $-0.84$ cm$(-1)$/kbar for R2 from 0 to 23 kbar. Another source gives value of $-0.93$ and $0.82$ respectively from 0 to 1 kbar. We can expect to see a shift of about 8 cm$(-1)$ of the 10 kbar maximum pressure of interest here.

A nuclear detonation in proximity with the sensor can manifest pressures up to 10 Kbars. Therefore, the computer will first determine the change in wavelength manifested by the fluorescence by subtracting the actual wavelength measured by the spectrometer 602 from the wavelength occurring at 1 atmosphere of pressure. Next the computer can multiply the value of the change in wavelength by the 0.0365 mm/kbar rate to yield an estimate of the pressure that produces this shift.

If the system of FIG. 6 includes the thermistor probe of FIG. 1, the computer might refine the estimate of the pressure by subtracting the amount of wavelength shift due to changes in temperature before multiplying the change times the rate.

The system of FIG. 1 includes a narrow band Filter 160. This filter is used in order to observe fluorescence at a particular frequency on the low frequency side of the fluorescence signal. As the pressure increases, the fluorescence will shift to lower frequencies also and an increase in signal will be observed. The signal will increase monotonically with pressure (but not linearly) until the peak of the peak of the fluorescence line is reached after which the signal would decline. There is enough room on the side of the line at room temperature to measure to 10 kbar. This require a filter that is 1 Å wide or less at the fluorescence frequency. While interference filters with such narrow passband exist, they would be quite expensive. A better approach is to use a filter with a 10 Å passband which is more commonly available and an etalon to to achieve the desired filtering. Once the sensor is calibrated for a particular temperature and observation frequency, very rapid pressure measurement should be possible.

The system of both FIGS. 1 and 6 should be calibrated. The sensor can be calibrated statically in a piston and cylinder device which contains a liquid or gas to provide the desired hydrostatic environment. Pressure is not applied directly to the sensor by the piston. A good pressure transmitting medium is hydraulic oil, which will work well to at least 100,000 psi. In addition, some oils are optically transparent which allows the optical properties of candidate sensor materials to be investigated. A commercially available pressure sensor will be immersed in the fluid along with the sensor under test to calibrate it. Alternatively, the fluid pressure could be monitored externally by a standard mechanical (Heise) pressure gauge. Fairly simply construction techniques (e.g. armored O-ring seals) can be used to construct the test cell if the pressure is limited to 10 kbar. I expect that a custom pressure test cell will have to be built to accomplish this calibration.

The sensor can be calibrated dynamically in a simple apparatus in the laboratory. Planar shock waves can be produced easily in a hollow tube (air shocks) or rod using a commercially available explosive nail driver. This is essentially a small caliber gun without the bullet. The cartridges for the gun are available in various sizes and should be a reasonably well controlled and reproduceable source. The initial shock is produced in air and has to be coupled to the desired medium. Thus air shocks can be produced efficiently but large losses are expected in coupling he air shock to a solid. If the sensor under test is mounted flush with the interior surface of the ruby used to propogate an air shock, a minimum perturbation of the wave will result.

Commercially available pressure sensors cannot be used to check the optical sensor's performance. To calibrate the optical sensor, the shock pressure must be derived from the shock wave velocity and particle velocity. If an optical sensor assembly is built containing two sensors which are known distance apart, then the shock wave velocity can be easily determined. The particle velocity can be determined by the standard technique of measuring the free surface velocity at the end of the rod. These measurements then allow the shock pressure to be calculated and compared with the value measured by the optical sensor.

The optical pressure sensor will not, in general, provide a linear output as a function of pressure. Some signal processing is required to convert the measured sensor output to a time dependent pressure signal. With proper choice of operating frequency, it may be possible to approach linear behaviour but if this is not possible the required signal processing is simple. All that would be required is to empirically test the pressure sensor, to correlate the measured changes in spectral wavelength with the actual pressures exerted on the sensor. Once this database is established, it can be stored in the computer of FIG. 6 and the sensor system is ready for operational use.

The system of FIGS. 1 and 6, as described above, is an optical pressure sensor which is not restricted by the mechanical limitations of mechanical pressure transducers. In operation, the system will measure dynamic changes in pressure up to those associated with a nuclear detonation.

While the invention has been described in its presently preferred embodiment it is understood that the words which have been used are words of description rather than words of limitation and that changes within the preview of the appended claims may be made without departing from the scope and spirit of the invention in its broader aspect.

What is claimed is as follows:

1. An optical pressure sensor comprising:

an excitation source which produces an illumination signal;

an optical sensor which receives said illumination signal from said excitation source, said optical sensor responding to said illumination signal with fluorescence which experiences a spectral wavelength shift in response to its environment, said wavelength shift in said fluorescence providing an optical measurement in pressure changes which are ambient to said optical sensor;

a means for measuring said spectral wavelength shift in said fluorescence produced by said optical sensor, said measuring means thereby yielding an indication of pressure changes in said optical sensors environment, said pressure changes ranging up to about 10 kbars said measuring means also receiving a temperature measurement signal and adjusting said indication of pressure changes for changes in temperature;

a means for conducting optical signals; said optical conducting means optically connecting said optical sensor with said excitation source and said measuring means, said optical conduction means thereby conducting said illumination signal to said optical sensor, and conducting said fluorescence from said optical sensor, to said measuring means; and a means for measuring temperatures in proximity with said optical sensor and outputing said temperature measurement signal so that thermally induced changes in said wavelength shift of said fluorescence are anticipated and subtracted from the wavelength shift actually measured, said temperature measuring means thereby providing an opportunity to eliminate thermal contamination from the indication of pressure changes measured in said optical sensor's environment; and a means for recording data, said recording means being electrically connected with said means for measuring said spectral wavelengths shift and said means for measuring temperature so that an actual wavelength shift of said fluorescence is measured while effects of thermal contamination of said wavelength shift are accounted for and eliminated from the induction of pressure changes in said optical sensor's environment.

2. An optical sensor, as defined in claim 1, wherein said optical sensor comprises a ruby which produces R1 and R2 lines of spectral fluorescence in response to said illumination signal from said excitation source, said R1 and R2 lines of spectral fluorescence respectively manifesting wavelengths of about 694.3 nanometers and 692.9 nanometers at one atmosphere of pressure, and exhibiting a shift towards a longer wavelength at a rate of about 0.0365 nanometers/Kbar for changes in pressure around said ruby.

3. An optical pressure sensor, as defined in claim 2, wherein said excitation source comprises: a high pressure mercury lamp which produces an intense optical signal; and a 6,300 angstrom high pass optical filter which receives and filters said intense optical signal from said high pressure mercury lamp to output said illumination signal to said optical conducting means.

4. An optical pressure sensor, as defined in claim 3, wherein said optical conducting means comprises;

a dichroic mirror which receives and reflects said illumination signal from said 6,300 angstrom high pass filter towards said ruby, said dichroic mirror receiving and reflecting said fluorescence from said ruby to said means for measuring said spectral wavelength;

an optical fiber which receives and conducts said illumination signal from said dichroic mirror to said ruby, said optical fiber also conducting said fluorescence from said ruby to said dichroic mirror; and a fiber optic coupler which optically connects said dichroic mirror with said optical mirror.

5. An optical pressure sensor, as defined in claim 4, wherein said means for measuring said spectral wavelength comprises:

a narrow band optical filter which receives and filters said fluorescence from said dichroic mirror; and an optical photovoltage detector which receives and converts said fluorescence from said narrow band optical filter into an electrical signal which indicates said spectral wavelength shift in response to changes in the environment of said optical sensor.

6. An optical pressure sensor, as defined in claim 5, wherein said means for measuring temperature comprises a thermistor probe which is electrically connected with said data recording means and which is physically placed in proximity with said ruby sensor.

7. An optical pressure sensor, as defined in claim 6, wherein said optical fiber is encased in a hardened casing which permits the optical fiber to relay pressure measurements up to pressures that approach 10 Kbars.

8. An optical pressure sensor, as defined in claim 4, wherein said means for measuring said spectral wavelength comprises:

a spectrometer which receives said fluorescence from said dichroic mirror, said spectrometer measuring said wavelength shift of the ruby's R1 and R2 lines of spectral fluorescence, and displaying the R1 and R2 lines while filtering out any of the illumination signal from the excitation source that may accompany the fluorescence through the dichroic mirror;

an optical array detector which receives and converts data into analog photovoltage electrical signals for the R1 and R2 lines from the spectrometer;

a transient digitizer which converts and stores the analog photovoltage electrical signals from the optical array detector into their digital equivalents, said transient digitizer thereby storing digital photo voltage electrical signals of said spectral wavelength shifts of said fluorescence of said ruby in response to changes in pressure; and a data processor which receives and displays said digital photovoltage signals so that the pressure in proximity with said ruby may be determined by the amount of spectral shift in wavelength exhibited by its fluorescence.

9. An optical pressure sensor comprising:

a high pressure mercury lamp, which produces an intense optical signal;

a 6,300 angstrom high pass filter which receives and filters said optical signal from said high pressure mercury lamp to produce thereby an excitation signal;

a chromium doped yttrium alluminate crystal which produces fluorescence in response to said excitation signal from said high pass filter, said fluorescence exhibiting a special shift in wavelength in response to ambient pressure, said shift is wavelength in said fluorescence thereby providing an optical indication of said pressure;

an armor clad optic fiber which is fixed at one end to said chromium doped yttrium alluminate crystal to conduct said excitation signal thereto, and which receives said fluorescence therefrom;

a dichroic mirror which conducts said excitation signal from said high pass filter to said armor clad optic fiber, said dichroic mirror receiving said fluorescence from said armor clad optic fiber;

a fiber optic coupler which optically connects said dichroic mirror with said armor clad optic fiber;

a spectrometer which receives said fluorescence from said dichroic mirror and measures said spectral shift in wavelength therein and displaying said fluorescence while filtering out any of the excitation signal that may accompany said fluorescence through said dichroic mirror;

an optical array detector which receives and converts said fluorescence from said spectrometer into analog photovoltage electrical signals;

an analog-to-digital converter which receives and converts said analog photovoltage electrical signals into digital photovoltage signals which manifest said spectral shift in wavelength; and a data processor which receives and displays said digital photovoltage signals so that the pressure in proximity with said chromium doped yttrium alluminate crystal may be determined by the amount of spectral shift in wavelength exhibited by its fluorescence.

* * * * *